May 3, 1932. R. DECAUX 1,856,541
MOVING PICTURE MACHINE
Filed May 10, 1929 2 Sheets-Sheet 1
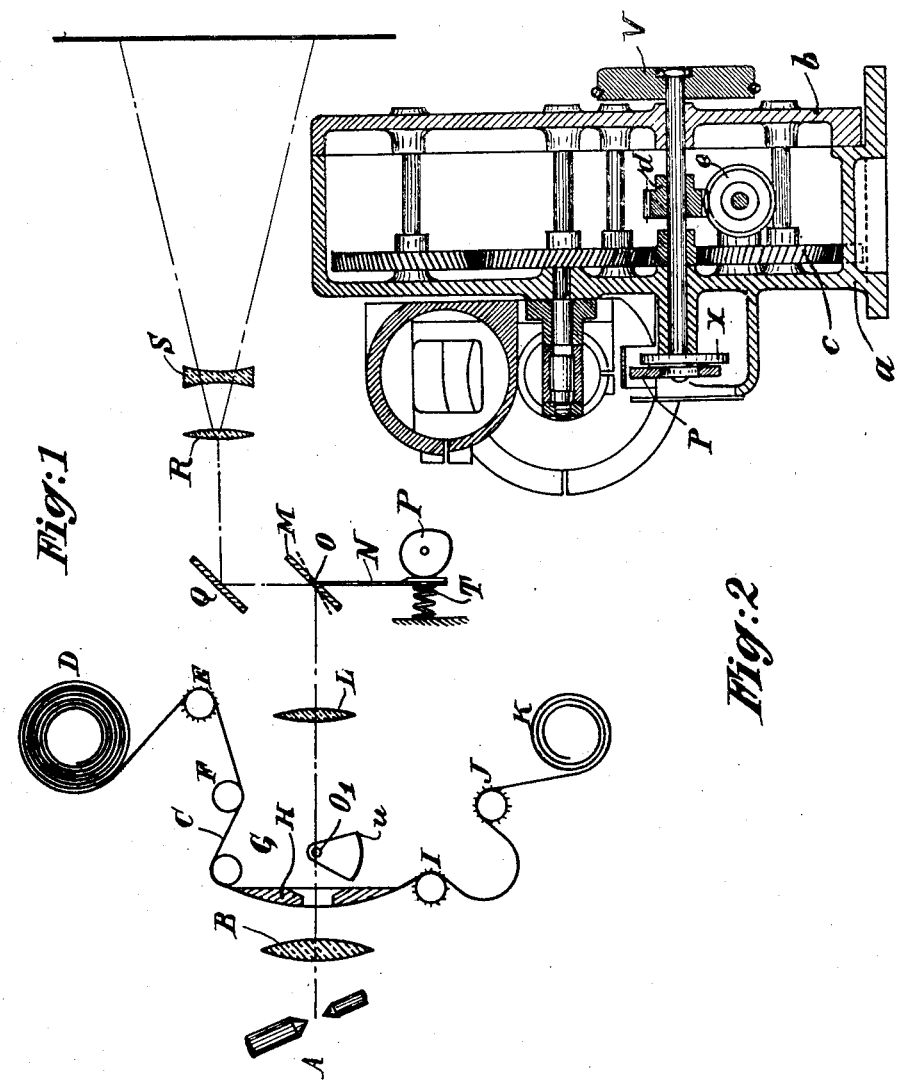
Inventor:-
René Decaux
By Mauro & Lewis
attorneys May 3, 1932.  R. DECAUX  1,856,541
MOVING PICTURE MACHINE
Filed May 10, 1929  2 Sheets-Sheet 2
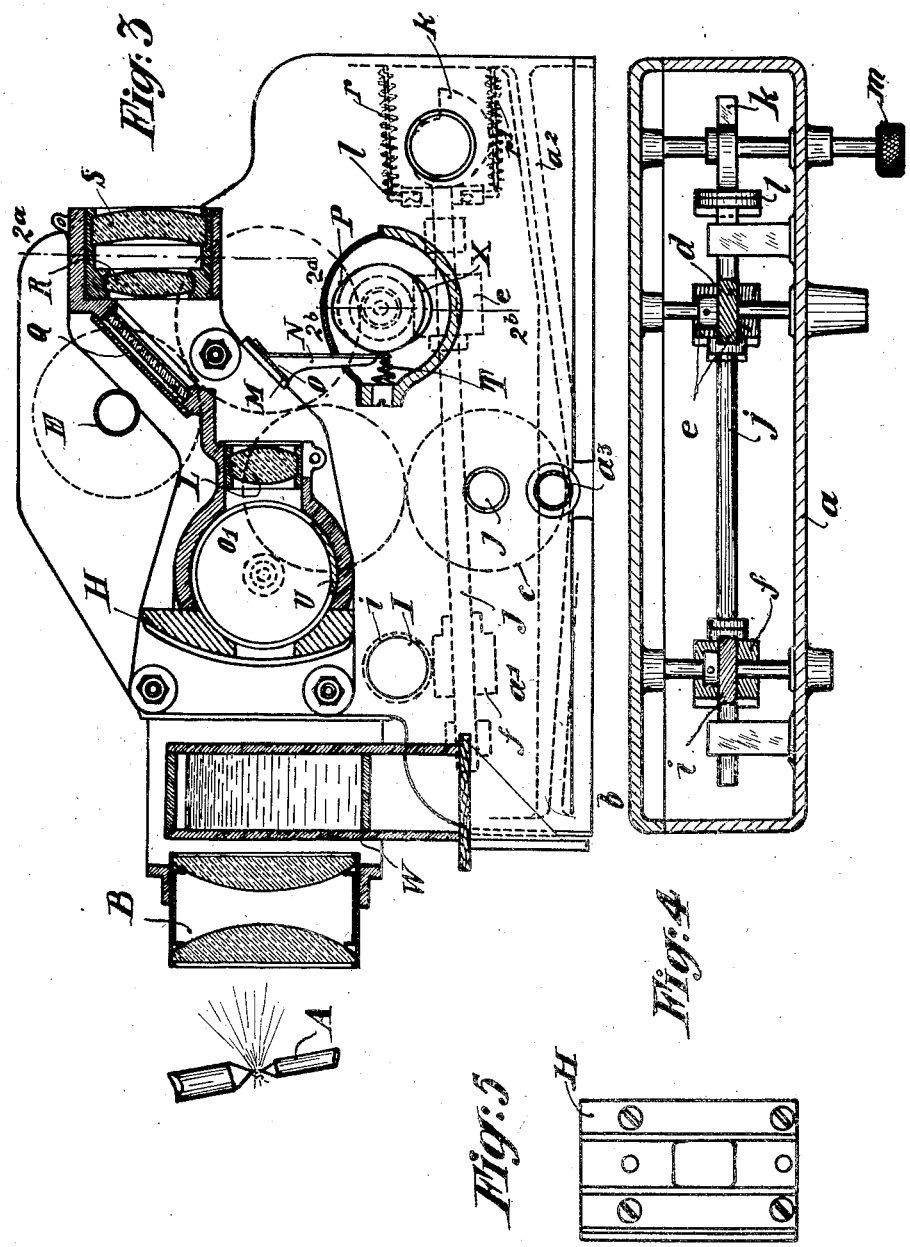

Patented May 3, 1932

1,856,541

UNITED STATES PATENT OFFICE

RENÉ DECAUX, OF PARIS, FRANCE, ASSIGNOR TO SOCIETE DES ETABLISSEMENTS GAUMONT, OF PARIS, FRANCE, A CORPORATION OF FRANCE

MOVING PICTURE MACHINE

Application filed May 10, 1929, Serial No. 361,923, and in France May 21, 1928.

The apparatus forming the object of my invention has been devised with a view to producing a simple construction and a minimum number of moving elements, and allows attaining a projection at the rate of thirty-five images per second and even more.

In my said apparatus, the film moves past in a continuous manner a window having a curved chamber lighted by a luminous source which is combined with a condenser and occupies the focal plane of an optical system which sends a beam of parallel rays on a mirror which is given an oscillating movement of variable amplitude. From there the luminous rays are directed on the screen after being again reflected on a stationary mirror disposed at 45° and passed through an objective of adjustable focal length. The oscillating movement of the mirror which is controlled by a cam is synchronized with the advancing movement of the band in such a way that between successive extinction established by means of a rotary blade, the image of a point of the film is maintained stationary on the screen.

The invention has principally for an object to provide a device which allows in a very simple way to change the angular position of the mirror with respect to the position of the cinematographic film on a guideway, and consequently to effect centering of the image.

The devices utilized which characterize my apparatus will be well understood by the following description with regard to the accompanying drawings given by way of example.

In the drawings—

Fig. 1 is a diagrammatic view partly in section showing the general lay-out of my apparatus;

Fig. 2 is a broken section taken along the lines 2ª—2ª and 2ᵇ—2ᵇ of Fig. 3;

Fig. 3 is a longitudinal section through the apparatus taken through the vertical plane passing through the axes of the different optical systems;

Fig. 4 shows in plan the gears establishing the connection between the driving arbor of the cam and the shaft of a toothed cylinder; and Fig. 5 illustrates the curved chamber.

A designates the luminous source, B a condenser and C the film issuing from the winding spool D, driven by a toothed cylinder E passing beneath a tensioning roller F, over a fixed roller G, over the curved guide H, over the toothed cylinder I, then over the toothed cylinder J at the same time forming a loop between these two cylinders and then finally on to the winding spool K.

L is an objective placed at such a distance from the guide H, that the surface of the film C during passing before the window of the said guide is in focal position, the image of the said film thus being formed endlessly. In other words the luminous rays leaving said objective are parallel and fall against the oscillating mirror M, the fixed mirror Q, then meet the objective R S having an adjustable focus composed of a converging element R, and a diverging element S, the distance of these two elements modifying the focal position of the system formed by their assembly for allowing proper focusing on a screen placed at any distance from the apparatus.

The mirror M is carried by a mounting having an arm N and oscillates about a point O.

The arm N is urged by a spring T on the cam P which, by its rotation, gives to the mirror a suitable oscillating movement, that is, such that a luminous ray issuing from a point on the film in motion will be stationary after reflection on the movable mirror M.

During the return of the mirror to its initial position indicated in dotted lines, a rotary cover plate or shutter O¹ adapted to be displaced before the window of the guide H interposes during a suitable time a blade U of cylindrical form in the path of the luminous beam between the guide H and the objective L. Said blade passes a second time in the field of the optical system producing a second occultation during the projection of the image, and this in order to diminish scintilating.

The principle of my invention having been outlined, the general construction thereof will now be described in Figs. 2 to 5. In these figures the above described elements are designated by the same reference characters as in Fig. 1. A transparent receptacle W is placed between lens B and part H. A frame $a$ on which fits a plate $b$, forms a sort of tight box possessing bosses forming the necessary bearings for the shafts carrying the various gears of the moving parts of the apparatus.

These gears are therefore enclosed thus being sheltered from any cause of deterioration. Moreover one of said gears indicated at $c$ in Figs. 2 and 3 is in contact with a layer of oil situated on the bottom of the frame $a$ composed of two inclined surfaces $a^1$ $a^2$, thus forming a trough in which the level of oil can be controlled by observing through a transparent window placed at $a^3$.

The gear $c$ thus dips into the oil and throws it on all the movable parts which are thus constantly lubricated as well as the shafts and the bosses forming bearings in which they rotate. The driving shaft controlled by the flywheel pulley V, carries at the other extremity the cam P and it also carries the control pinions of the various gear trains controlling the shutter and the toothed cylinders E J respectively serving for the unwinding of the upper winding spool and the feeding of the lower winding spool.

On said driving shaft is keyed a helicoidal pinion $d$ controlling another helicoidal pinion $e$ fixed on a shaft $j$ which carries at another point a helicoidal pinion $f$ meshing with a helicoidal pinion $i$ keyed on the driving shaft of the toothed cylinder I.

Two springs $r$ $r^1$, acting on a ball-bearing stop $l$ fixed to the extremity of the arbor $j$ cause said stop to bear in constant fashion on a cam $k$ rigid with a manipulating knob $m$ situated outside the apparatus.

When the band, driven by the toothed cylinder controlled by the pinions $i$ and $f$, moves by the window in guide H, the displacement of the mirror under the action of the cam P controlled by the pinions $e$ and $d$ is such that the image of a point on the band remains stationary between two successive closings. There thus exists in this interval of time and for a predetermined adjustment, a definite correspondence between each angular position of the mirror and each position of the band on the guide H. For modifying the relative positions, in this correspondence, it suffices to give to one of the two toothed wheels $i$ or $d$ an angular advance. The problem is resolved by a longitudinal displacement of the shaft $j$ (Fig. 4) by means of the cam $k$, which displacement produces rotation of unequal magnitude of the helicoidal pinions $i$ and $d$, the inclination of the threads not being the same in the two sets $e$ $d$ and $i$ $f$. This allows choosing of the position of the film corresponding to the movement of the oscillating mirror M, and consequently centering of the image projected on the screen, that is, framing of the image on the screen. The advantage of this device is that it necessitates between the cam and the driving cylinder no auxiliary element susceptible to interfering with the necessary precision for the angular position of these two elements during their rotation and cause a defect in the stability and clearness of projection.

It is to be understood that modifications in detail could be made in the device just described without departing from the spirit of my invention as comprehended within the scope of the appended claims.

Having described my invention what I claim as new and desire to secure by Letters Patent is:—

1. In a moving picture projecting apparatus of the type described, the combination of film lighting and guiding means, a window for said film, a rotary shutter adapted to be displaced before said window, an objective placed at the focal distance thereof from said film, an oscillating mirror, optical means for reflecting the beams of light reflected by said oscillating mirror on a projection screen, a toothed film advancing roller, a helicoidal pinion for controlling said roller, a second helicoidal pinion for operating said oscillating mirror, a transverse arbor disposed perpendicularly to the axes of said helicoidal pinions, two pinions carried by said transverse arbor meshing respectively with said first mentioned helicoidal pinions, the teeth on said two sets of pinions being of different pitch whereby displacement of said transverse arbor produces angular displacement of said toothed film advancing roller and said oscillating mirror with respect to each other.

2. In a moving picture projecting apparatus of the type described, the combination of film lighting and guiding means, a window for said film, a rotary shutter adapted to be displaced before said window, an objective placed at the focal distance thereof from said film, an oscillating mirror, optical means for reflecting the beams of light reflected by said oscillating mirror on a projection screen, a toothed film advancing roller, a helicoidal pinion for controlling said roller, a second helicoidal pinion for operating said oscillating mirror, a transverse arbor disposed perpendicularly to the axes of said helicoidal pinions, two pinions carried by said transverse arbor meshing respectively with said first mentioned helicoidal pinions, the teeth on said two sets of pinions being of different pitch whereby displacement of said transverse arbor produces angular displacement of said toothed film advancing roller and said oscillating mirror with respect to each other, a cam adapted to bear against the extremity of said transverse arbor and means for varying the angular position of said cam.

3. In a moving picture projecting apparatus of the type described, an oscillating mirror, means for advancing the film, a helicoidal pinion for controlling said means, a second helicoidal pinion for operating said oscillating mirror, a transverse arbor disposed perpendicularly to the axes of said helicoidal pinions, two pinions carried by said transverse arbor meshing respectively with said first mentioned helicoidal pinions, the teeth on said two sets of pinions being of different pitch, whereby displacement of said transverse arbor produces displacement of said means for advancing the film and said oscillating mirror with respect to each other.

4. In a moving picture projecting apparatus of the type described, an oscillating mirror, means for advancing the film, a helicoidal pinion for controlling said means, a second helicoidal pinion for operating said oscillating mirror, two other pinions meshing respectively with said first-mentioned helicoidal pinions, the teeth on said two sets of pinions being of different pitch, whereby simultaneous displacements of said second mentioned helicoidal pinions produce displacement of said means for advancing the film and said oscillating mirror with respect to each other.

5. In a moving picture projecting apparatus of the type described, an oscillating mirror, means for advancing the film, a helicoidal pinion for controlling said means, a second helicoidal pinion for operating said oscillating mirror, a transverse arbor disposed perpendicularly to the axes of said helicoidal pinions, two pinions carried by said transverse arbor meshing respectively with said first-mentioned helicoidal pinions, the teeth on said two sets of pinions being of different pitch, a cam adapted to bear against the extremity of said transverse arbor, means for varying the angular position of said cam and elastic means adapted for urging the extremity of said arbor on said cam.

6. In a moving picture projecting apparatus of the type described, an oscillating mirror, means for advancing the film, a helicoidal pinion for controlling said means, a second helicoidal pinion for operating said oscillating mirror, a transverse arbor disposed perpendicularly to the axes of said helicoidal pinions, two pinions carried by said transverse arbor meshing respectively with said first mentioned helicoidal pinions, the teeth on said two sets of pinions being of different pitch, a cam adapted to bear against the extremity of said transverse arbor, means for varying the angular position of said cam, a ball-bearing stop fixed to the extremity of the transverse arbor and springs for urging said ball bearing stop on said cam.

In testimony whereof I have signed this specification.

RENÉ DECAUX.